United States Patent [19]
Howard et al.

[11] 3,709,160
[45] Jan. 9, 1973

[54] PALLETS

[76] Inventors: John Arthur Howard, 2 Audley Close Weston, Somerset; Gwendolen Alice Sergant, Longacre Walberton Arundel, Sussex, both of England

[22] Filed: March 11, 1971

[21] Appl. No.: 123,180

[30] Foreign Application Priority Data

March 18, 1970 Great Britain.....................13,079/70

[52] U.S. Cl. .........................108/51, 108/53, 108/58
[51] Int. Cl. ..............................................B65d 19/00
[58] Field of Search................................108/51–58; 206/60 A, 65 B; 219/10.5

[56] References Cited

UNITED STATES PATENTS

| 3,272,158 | 9/1966 | Barnum | 108/51 |
|---|---|---|---|
| 2,896,798 | 7/1959 | Celley | 108/52 X |
| 2,116,381 | 5/1938 | Burke | 206/60 A |
| 3,253,707 | 5/1966 | Gooding | 206/65 B |
| 2,615,661 | 10/1952 | Cushman | 108/53 |
| 2,544,743 | 3/1951 | Vrabcak | 108/58 |

FOREIGN PATENTS OR APPLICATIONS

| 248,783 | 1/1964 | Australia | 108/56 |
|---|---|---|---|
| 1,277,133 | 9/1968 | Germany | 108/51 |

*Primary Examiner*—Bobby R. Gay
*Assistant Examiner*—Peter A. Aschenbrenner
*Attorney*—Young & Thompson

[57] ABSTRACT

A pallet moulded from plastics material comprises a platform with incut recesses at its edges. The platform may also have box-like dished recesses in spaced positions in its surface. The dished recesses are all of the same height to serve as supporting legs, and are tapered to allow a plurality of pallets to nest on top of one another.

8 Claims, 6 Drawing Figures

Inventors
JOHN ARTHUR HOWARD
GWENDOLEN ALICE SERGANT
By Young, & Thompson
Attorneys

PATENTED JAN 9 1973 3,709,160

Inventors
JOHN ARTHUR HOWARD
GWENDOLEN ALICE SERGANT
By Young & Thompson
Attorneys

PALLETS

This invention relates to pallets, and aims at the production of a form of pallet having advantages in comparison with those now in common use.

The invention consists in a pallet comprising a rectangular board or platform having hollow box-like recesses constituting "legs", and the unrecessed upper surface area being flat, the side edges of the board or platform being formed with incut recesses to facilitate engagement by lifting means e.g. hook grabs or loops.

Preferably the pallet is moulded from plastics material, and may comprise a layer of foamed plastics material which may be provided with a laminate layer of plastics film or sheet on either or each face. The upper face of the pallet is preferably formed with cavities or recesses, e.g. a central dished recess, and a stepped recess in the middle of each side of the pallet. Beneath the pallet the walls of these recesses form "legs" and between them provide channels or tunnels, extending from each side to the opposite side of the pallet, allowing insertion of the limbs of a lifting fork to lift the pallet. The spacing and/or dimensions of these channels or tunnels are such as to accommodate the differing limb arrangements of various fork-lift mechanisms. The "legs" are preferably all of the same height.

The invention will be clearly understood from the following description of one form (given, however, merely by way of example) which it may assume, and this description will be more readily followed by reference to the drawings herewith wherein FIG. 1 represents a perspective view of a pallet in accordance with the invention:

In carrying the invention into effect in one convenient manner, as shown in the aforesaid drawings, a pallet comprises a rectangular board 1, with plain i.e. unturned or unrolled edges, formed with cavities or recesses in its upper surface. Such cavities or recesses may comprise a square or rectangular central cavity 2, end recesses 3, and side recesses 4. The side and end recesses may, as shown, have no outer side walls, and the free wall edges of these recesses may be short of alignment with the edge of the board 1, as at 5. For strength each cavity or recess is formed with a base rigid with the side walls.

Figure 1:
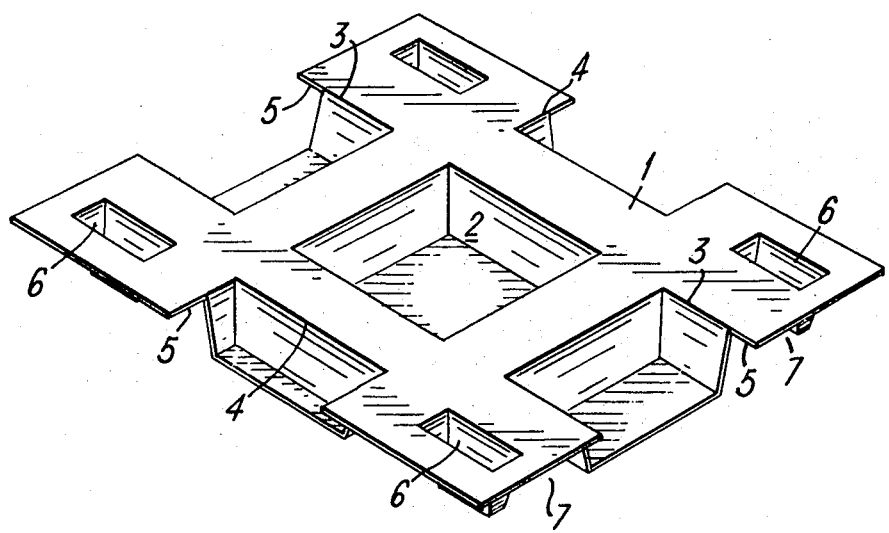
Figure 2:
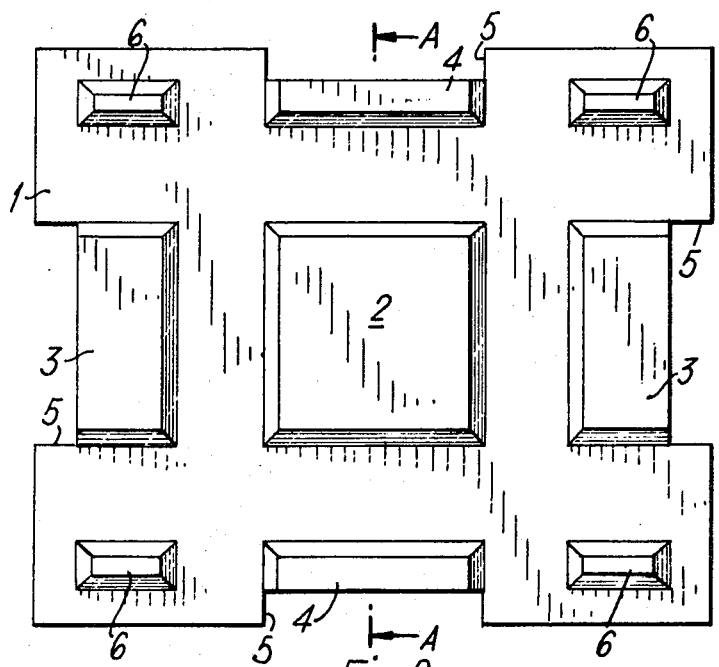
FIGS. 2, 3 and 4 represent the pallet shown in FIG. 1 in plan, side and end views.
Figure 3:
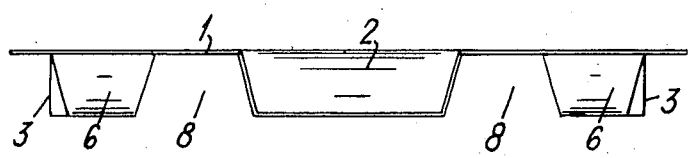
Figure 4:
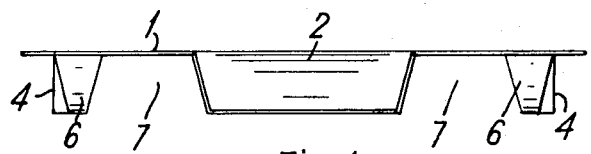
Figure 5:
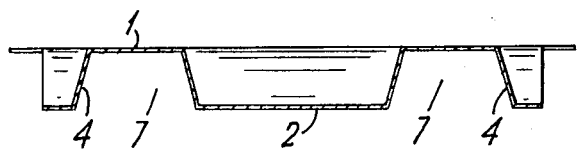
FIG. 5 represents a transverse sectional elevation in the plane A—A of FIG. 2.

Adjacent to each corner of the board 1 may be provided a further recess 6, e.g. of comparatively narrow rectangular shape. As seen in FIG. 2 the dimensions and locations of these cavities or recesses are selected so that the sides are in alignment, and the cavities or recesses form regular rows and columns in the surface of the board.

Beneath the board 1 the downwardly projecting side walls of the cavities and recesses are of the same depth so that all serve to support the board 1, and they form between them open-ended channels or tunnels extending substantially from edge to edge of the board in both directions. There are thus provided two parallel channels 7 running from end to end of the board, and two transverse channels 8, running across the board from side to side. These channels allow the fork limbs of lifting means to be inserted beneath the board 1 from any side, for lifting purposes. The widths and/or spacings of the channels are selected to allow insertion of different pairs of fork limbs varying as regards their width and/or spacings. Location of the edges of the side recesses 3 and 4 inwardly of the edges of the board 1, leaves the latter free to fit thereto hooks or loops e.g. if it is desired to raise the pallet by crane. The side walls of the recesses and cavities are slightly inwardly inclined, so that each cavity or recess is of frusto-pydamidal shape, allowing a plurality of these pallets to nest together when stacked upon one another.

Preferably the areas of the flat upper surface of the board 1 (which bears the load), and the total area of the undersurfaces of the "legs" 2, 3, 4, 6 are selected to ensure uniform pressure distribution, and, as illustrated, the flat upper surface may have an area of approximately 50 percent of the overall plan area of the pallet, while the total area of the undersurfaces of the "legs" may have an area of approximately 40 percent of the overall plan area of the pallet.

Figure 6:
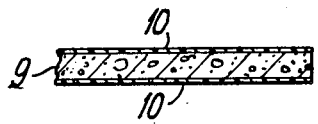
FIG. 6 represents an enlarged cross-section of part of the material from which the pallet shown in FIGS. 1–5 may be made.

A pallet such as shown in FIGS. 1–5 is preferably moulded from plastics material. A thick layer 9 of foamed plastics material (FIG. 6) may be provided on either or each of the upper and lower surfaces with a laminate sheet or film 10 of unfoamed plastics material (which may be the same as, or different from the inner material 9). The moulding, in one convenient manner, may be carried out in accordance with the procedure set out in British Pat. No. 1,110,332. While the pallet may be of any desired shape, size and relative dimensions, it is more appropriately made for use in the United Kingdom in accordance with the standards laid down in B.S.1 Leaflet No. 2629, Part 1, 1967.

It will be noted that the incut "gaps" 5 in the sides of the board 1 facilitate engagement of a loop or grabs with the corners of the pallet and prevent slipping while the pallet is being lifted.

It should be understood that the invention is not limited solely to the details of the form described above, which may be modified, in order to meet various conditions and requirements encountered, without departing from the scope of the invention.

What we claim is:

1. A pallet comprising a platform of overall rectangular plan shape, having a flat surface and a recess in the middle of each edge, a wall extending downwards below the platform from each edge of each of said recesses, the said walls of each recess joining a floor to form therewith a three-sided box-like leg to support the platform, the free edges of the walls at the open side of said box-like leg being located inwardly of and spaced from the edge of the platform, and openings in the platform, from each of which extends downwards below the platform a hollow box-like structure forming a leg to support the platform, all said legs being of the same height and the whole structure being integrally moulded from plastics material.

2. A pallet according to claim 1 wherein the said edge recesses are rectangular.

3. A pallet according to claim 1 wherein the said openings are rectangular.

4. A pallet according to claim 1 comprising an opening constituting the mouth of a leg located at each corner of the platform.

5. A pallet according to claim 1 comprising a central rectangular opening constituting the mouth of a central leg.

6. A pallet according to claim 1 wherein the side walls of the legs taper slightly inwardly.

7. A pallet according to claim 1 wherein the flat supporting surface of the platform is not more than 50 percent of the overall plan area of the pallet.

8. A pallet according to claim 1 wherein the total base area of the legs is 40 per cent of the overall plan area of the pallet.

* * * * *